UNITED STATES PATENT OFFICE.

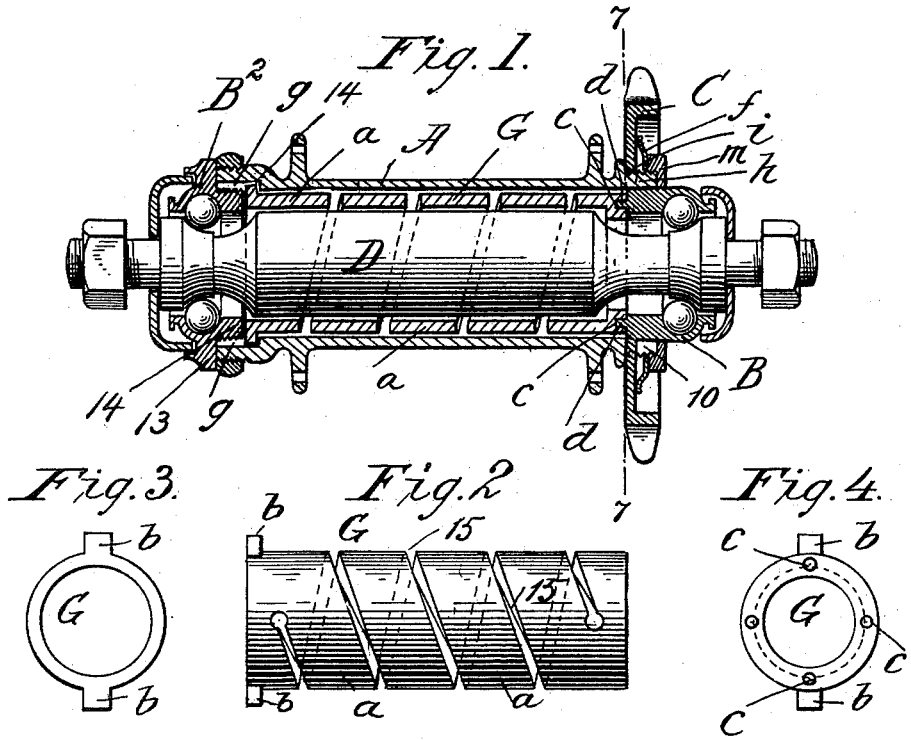

GEORGE T. WARWICK, OF NEWARK, NEW JERSEY.

BICYCLE-BRAKE.

SPECIFICATION forming part of Letters Patent No. 592,599, dated October 26, 1897.

Application filed March 15, 1897. Serial No. 627,603. (No model.)

*To all whom it may concern:*

Be it known that I, GEORGE T. WARWICK, a subject of the Queen of Great Britain, residing at Newark, in the county of Essex and State of New Jersey, have invented certain new and useful Improvements in Bicycle-Brakes; and I do hereby declare the following to be a full, clear, and exact description of the invention, such as will enable others skilled in the art to which it appertains to make and use the same.

This invention relates to brakes for bicycles and analogous vehicles, and pertains more particularly to a class of brakes which are constructed so as to be operated by reason of the back-pedaling action accomplished by the rider.

The objects of the present invention are to devise a brake mechanism of the class indicated which shall be very efficient and certain in its braking action, very simple and light in construction, involving the necessity of the least possible number of parts additional to those commonly employed at the hub and axle of the vehicle, and which is susceptible of application in a most compact and secluded manner internally in the hub, being concealed from view and protected against exposure and dirt.

The invention consists in a brake for bicycles or other vehicles, in the combination of a hub and a member, as a sprocket-wheel, mounted on and movable in unison with the hub and having an additional independent movement relative to the hub, of a fixed support or axle, and an appliance which consists of a shell provided with a helical slot whereby a series of convolutions are provided having one portion thereof connected to the hub and another to the said movable member and adapted when said member has its independent movement to be constricted about the adjacent fixed part or axle.

The invention furthermore consists in certain subordinate constructions and arrangements of parts, all substantially as will hereinafter fully appear, and be set forth in the claims.

In the accompanying drawings my improvements in brake mechanism are illustrated as applied in relation to the hub of the rear wheel of a bicycle and the axle about which said hub rotates.

In said drawings, Figure 1 is a sectional view centrally through the hub and its appliances and through said brake mechanism, the axle, which is understood as fixed, and the cones being represented in side view. Fig. 2 is a side view of the device which comprises the constrictive convolutions and which constitutes a prominent component in the improved mechanism. Figs. 3 and 4 are views of the different ends of said constrictive device. Figs. 5 and 6 are views taken at the opposite ends of the wheel-hub, disclosing important structural features to be hereinafter pointed out. Fig. 7 is a cross-sectional and face view of parts as seen at the plane indicated by the line 7 7, Fig. 1, looking toward the right. Fig. 8 is an outer face view of a frictional ring to be hereinafter mentioned.

Similar characters of reference indicate corresponding parts in all of the views.

In the drawings, A represents the hub, the same being constructed as usual, except in respect of the grooves $g\ g$, extended longitudinally within its inner wall from the one end, and the recesses or apertures 10, cut longitudinally from and within its other end, whereby such end portion of the annular hub is divided into the separated arc-formed members, prongs, or projections $h\ h\ h$. As usual, the hub has at its one end the ball-case $B^2$, which is formed with the cylindrical hub-like extension 14, which screws in the end of the hub and has the external step-like flange 13, which overlies the end of the hub. At the other end of the hub the sprocket-wheel C and the ball-case B are shown as integrally formed, although these parts may be separately formed, if desired.

The sprocket-wheel is constructed and applied on the hub so as normally to rotate in unison therewith, but to have an independent rotational movement on and relative to the hub, and, as shown, the sprocket-wheel has the three arc-formed recesses or apertures $i\ i\ i$, which enable the sprocket-wheel to be slipped over the separated projections $h\ h\ h$ of the hub and to have an interlocking engagement therewith, it being perceived, however, that the said recesses $i$ are somewhat longer than the arc in which the separate projections $h$ of the hub are comprised, all whereby when the sprocket-wheel is being positively turned by the sprocket-chain as the wheel is driven in the direction of the large arrow, Fig. 7, the end boundaries of the recesses $i$ are in contact with the adjacent edges of the hub projections $h$, so that the hub is positively driven as one with the sprocket-wheel, but whereby, on the other hand, the wheel and hub, assumed to be running by momentum or on a downgrade, when a retarding force is applied to the sprocket-wheel in the direction of the small arrow in Fig. 7, as would be accomplished by a back-pedaling as well known in bicycling, the sprocket-wheel will have a slight extent of independent reverse rotational movement relative to the hub as permitted by the recesses $i$ being elongated.

D represents the axle about which the hub rotates, the same being understood as adapted to be set and confined between the rear legs or fork of the bicycle-frame, the axle being properly equipped with cones, between which and the race-grooves in the ball-cases are comprised the balls. The intermediate portion of the axle D, as shown, is constructed of somewhat increased diameter beyond that usually given to the rear-wheel axle in bicycles, which is a provision of preference and not of necessity, and in order that the axle may not by reason of its increased diametrical dimension be unduly heavy it may be cored out or constructed hollow.

G represents the device, which comprises the several convolutions $a\ a$, the same, as I have constructed it, consisting of a cylindrical shell open from end to end, having at its one end the external radially-extending projections or trunnions $b$ and having at its opposite end the several holes or sockets extending from such end longitudinally within the thickness of the wall of the shell, and the convolutions are constituted by a helical kerf 15, which preferably has its beginning near but within one end of the shell and extends in its helical course nearly but not quite throughout the length of the annular shell, terminating within the opposite end thereof, as more particularly seen in Fig. 2. This kerfed shell G is slipped within the annular space in the hub between the latter and the enlarged portion of the axle D, its end trunnions $b\ b$ being sunk within and having an interlocking engagement with the side walls of the grooves $g\ g$, whereby the end of the constrictive device becomes anchored to the hub. The aforementioned cylindrical hub portion 14 of the ball-case B², being screwed in place in the left-hand end of the hub within the internally-threaded wall within which the aforesaid grooves $g\ g$ are provided, covers and conceals the adjacent end of the constrictive shell G and may also serve to prevent any undue endwise movement or displacement of the latter. With the opposite ends of the said constrictive shell G, in the sockets $c$ thereof, interlock and engage the studs or projections $d\ d$ inwardly and longitudinally extended from the inner face of the sprocket-wheel C, all whereby as the sprocket-wheel has its limited independent reversed rotational movement relative to the hub, as aforesaid, a twisting movement is imparted to the constrictive shell, the farther end of which, it is remembered, is immovable relative to the hub, which twisting movement causes a constrictive action of the convolutions of the part G—that is, a diametrical contraction thereof—resulting in a frictional bind against the periphery of the axle D and a most effectual braking and retardation of the running-wheel hub. I desire to state that the kerf 15 may be extended from end to end of the device G—that is, the device may be produced by a strip or strap of flat spring metal wound in helically-running convolutions, or the kerf may extend from near the one end of the shell quite to the other; but the device G, constructed as shown, is deemed to be considerably the best, as it is susceptible of all requisite constriction as described, being sufficiently sensitive under moderately-applied force, and at the same time the so-constructed device possesses a desirable stability, which it would not have were it rendered more flimsy by having the kerf extended from end to end, as it might be even with fair results.

It will be perceived that the brake device hereinabove described involves or necessitates, in addition to the usual axle, hub, and sprocket-wheel, merely one part—to wit, the constrictive device G—all else necessary to render the device operative being features or formations of construction in the hub and sprocket-wheel which cannot be regarded as additional parts or anything which will create additional weight. I have, however, shown at $f$ an annular friction-ring having a curved or ogee cross-section surrounding the end portions $h\ h\ h$ of the hub and bearing against the outer face of the sprocket-wheel and held in place by the locking-nut $m$. This will serve to retain the sprocket-wheel in any given set position relative to the hub, so that after a back-pedaling pressure has been exerted to set the brake the brake will remain set until a purposed forward pedaling or driving movement of the sprocket-wheel is given.

Having thus described my invention, what I claim, and desire to secure by Letters Patent, is—

1. In a brake for bicycles or other vehicles, in combination, a hub and a member mounted on, and movable in unison with the hub, and having an additional independent movement relative to the hub, a fixed support or axle, and an appliance which consists of a shell provided with a helical slot whereby a series of convolutions are provided having one portion thereof connected to the hub, and another to the said movable member, and adapted when said member has its independent movement to be constricted about the adjacent fixed part or axle.

2. In a brake for bicycles or other vehicles in combination, a hub, and a member mounted on and movable in unison with the hub, and having an additional independent movement relative to the hub, a fixed support or axle, and a shell constructed with a slot and capable of constriction under a twisting force, a series of convolutions, having one portion thereof connected to the hub, and another to the said backward and forwardly movable member, and a friction device having bearing against said sprocket-wheel, substantially as described.

3. In a brake for bicycles or other vehicles in combination, a hub, and a member mounted on and movable in unison with the hub, and having an additional independent movement relative thereto, an axle, and an appliance comprising a series of convolutions, having one portion thereof connected to the hub, and another to the said backward and forwardly movable member, the friction-ring $f$ surrounding an end portion of the hub, and bearing on the face of the sprocket-wheel, and the nut $m$ screwing into the end portion of the hub, against said friction-ring, all substantially as and for the purposes set forth.

4. In a brake for bicycles or other vehicles in combination, a hub having within its one end one or more grooves $g$, and a member mounted on and movable in unison with the hub, and having an additional independent movement relative to the hub, a fixed axle, and an appliance comprising a series of convolutions, having at one end thereof the one or more projections $b$, engaged in said grooves of the hub, and having its other end connected with said movable member, for the purpose set forth.

5. In a brake mechanism, in combination, a hub, having within its one end the internal longitudinal grooves $g\,g$, and a sprocket-wheel mounted on and adapted to be movable in unison with the hub, and having an additional independent movement relative to the hub, a fixed axle around which said hub rotates and an appliance located within the annular space between the hub and axle comprising a series of convolutions, and having at one end the projections $b$ engaging in said hub-grooves $g$ and having at its other end an endwise-interlocking pin-and-socket engagement with said sprocket-wheel, substantially as and for the purpose set forth.

6. In a brake for bicycles or other vehicles, the combination with a hub having its end constructed with recesses 10 whereby the separated arc-formed members $h\,h$ are produced, of the sprocket-wheel having the arc-formed recesses $i$, which are of somewhat greater extent than the widths of said projections $h$, the axle and the shell G having the convolutions $a\,a$, said shell having one end portion secured to the sprocket-wheel and another end portion thereof being engaged with the hub, substantially as described.

7. In a brake for bicycles the combination with the hub having its one end internally screw-threaded and also provided with the internal longitudinally-extended grooves $g\,g$, of the sprocket-wheel mounted on the hub to turn therewith and to have an independent movement, the axle extended through the hub, the shell G having the convolutions $a\,a$, and the external projections $b$ entered in said grooves $g\,g$, and having its end which is adjacent the sprocket-wheel interlocked therewith, and the ball-case $B^2$ having a cylindrical screw-threaded portion, threading in the end of the hub, and covering the end of the said shell G, substantially as described.

8. In a brake for bicycles or other vehicles, in combination, a hub and a member mounted on and movable with the hub and having an independent movement relative to the hub, a fixed axle or support relative to which the hub rotates and the cylindrical shell having a helically-running slot which begins and terminates within the ends of said shell, one end of the shell being engaged with the hub, and the other with said backward and forwardly moving member, substantially as described.

In testimony whereof I affix my signature in presence of two witnesses.

GEO. T. WARWICK.

Witnesses:
WM. S. BELLOWS,
M. A. CAMPBELL.